May 4, 1943. L. G. COPEMAN 2,318,375
CLOTHESLINE
Filed June 6, 1940
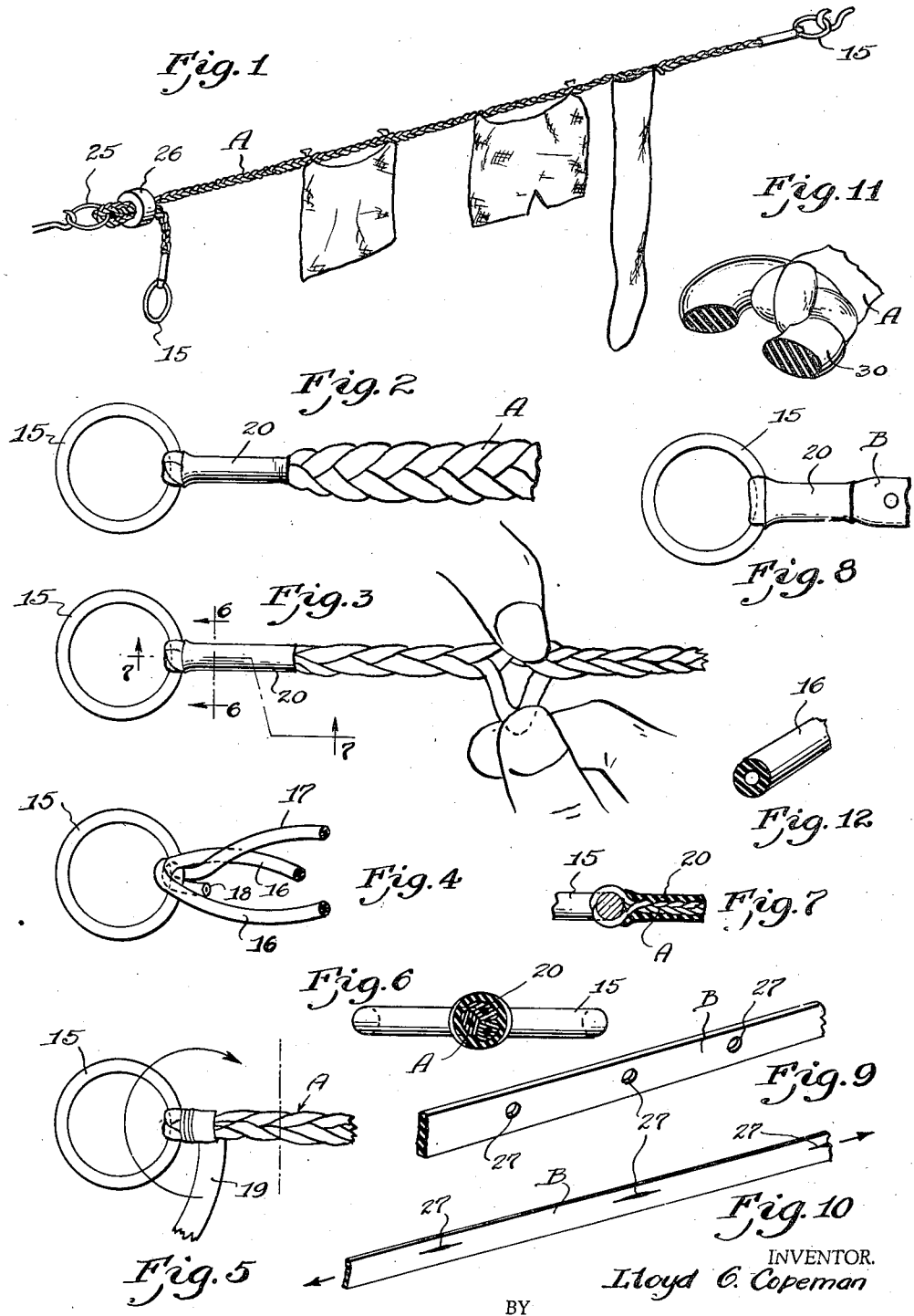
INVENTOR.
Lloyd C. Copeman
BY Barnes, Kisselle, Laughlin & Raisch
ATTORNEYS Patented May 4, 1943

2,318,375

UNITED STATES PATENT OFFICE 2,318,375

CLOTHESLINE

Lloyd G. Copeman, Metamora, Mich.

Application June 6, 1940, Serial No. 339,083

9 Claims. (Cl. 211—119.13)

This invention relates to an improved clothesline.

It is an object of the present invention to provide a clothesline which, when not in use, occupies a minimum space and which is so designed that it may be used to suspend garments and other articles without the use of clothes pins or clips of any sort.

A further object of the invention is to provide a means for fastening the ends of the line in a secure fashion, the line being made of an elastic material for which it is ordinarily difficult to provide an end connection. Briefly, the invention consists of a cord or band which is provided with apertures along its length and which is formed of a flexible, smooth elastic material such as rubber. When the band is stretched, these slits may be spread apart and a portion of an article drawn through. When the band is released, the article will be retained in the slit.

Some advantages of the line are that it may be easily cleaned because of its smooth surface, may be quickly installed for use, will not sag due to moisture, and will not snag even the finest of fabrics. Furthermore, a slight pull on the fastened article will release it.

Other objects and features of the invention, having to do with details of construction, as, for example, the end construction and the adjustment construction, will be brought out in the following description and claims.

In the drawing:

Fig. 1 shows the line suspended with certain fabric articles fastened thereto.

Fig. 2 shows one end of the line in unstretched condition.

Fig. 3 is a view similar to that of Fig. 2 showing the line stretched.

Figs. 4 and 5 illustrate the manner in which an end ring is fastened to the line.

Figs. 6 and 7 are sectional views on lines 6—6 and 7—7, respectively, of Fig. 3.

Fig. 8 illustrates the end of a modified type of line.

Fig. 9 illustrates the modified type of line of Fig. 8 in unstretched condition.

Fig. 10 illustrates the line of Fig. 9 in stretched condition.

Fig. 11 illustrates the line with a flexible rubber end ring.

Fig. 12 is a section of a strand of material used to make up the line of Fig. 2.

Briefly, the invention consists of a cord A formed of a braid of at least three strands of rubber tubing. Suitable means are provided for fastening the ends of the braid and when the line is stretched between two hooks, as shown in Fig. 1, garments may be suspended thereon by spreading apart one of the strands of the braid, as shown in Fig. 3, and inserting the corner of a garment or article therein. When the strand is released the corner will be held in frictional engagement. Rubber tubing has been found to be the most desirable strand for forming the braid since it forms a tighter finished cord or line and still furnishes a soft resulting product, with plenty of friction between the strands when stretched.

A modified line is shown in Figs. 8, 9 and 10 wherein a simple strip of rubber B is suitably fastened at the ends and provided with holes at spaced intervals so that when the strip is stretched, as in Fig. 10, the holes become slits which may be spread apart and through which a portion of a garment or other article may be pulled for suspension purposes.

The manner of securing the ends of the embodiment of Fig. 1 is shown in Figs. 4 and 5. A closed ring 15 is first provided. One strand 16 is looped through the ring and another strand 17 has an end 18 passed through the ring. These strands are held tightly adjacent the ring 15 until the strand is braided for some distance away from the ring and then the fastening means may be applied. The fastening means consists of a strip or bandage 19 of latex which is formed by spraying a thin layer of latex on a thin sheet of paper, pressing the layers together, and then stretching or tearing the paper to release the layers thus formed. This band of latex is wrapped around the ends of the strands 16 and 17 when the braided cord is stretched, this wrapping being done while the latex is under tension. The band of latex is preferably applied when it is not fully set up so that being tacky, it bonds with itself as it is wrapped to form a homogeneous rubber collar 20 under tension. This firmly holds the strands of the braid together. The same result can be obtained, of course, if the line or cord is first braided and then one end doubled back upon itself and through the ring 15, the parallel portions being stretched during the application of the latex bandage.

A means for adjustment may be provided by the use of a ring 25 through which the cord A is threaded. A rather stiff collar of rubber 26 is passed over a loop of the cord, the ring 25 being located at this loop. It will be seen that from the showing of Fig. 1, the ring 25 can be slipped along the line and locked in position by pushing the loop toward the ring 25.

In Fig. 8, the modified construction, which consists of a rubber strip B, is furnished with an end ring which may be fastened to the strip 15 by doubling the strip upon itself and locking with a collar 20, as described in connection with Figs. 4 to 7. The apertures in strip B are shown at 27.

The rings 15 and 25 may be formed of metal, a plastic or some soft flexible material which has sufficient tensile strength to be suitable. A rubber ring 30 is shown in Fig. 11. In some cases, a soft flexible ring may be more desirable to prevent injury in case of backlash. The soft flexible ring 30 also has the advantage that it may be stretched over various projections or pieces of hardware in any room so that the clothesline may be suspended at any point that is convenient.

Other means may, of course, be provided for fastening the ends of the cord or strip to the rings or loops. The means and method illustrated in Fig. 5 are, however, preferred since this makes the entire connection a resilient one. As shown in Fig. 3, when the cord is stretched, the collar 20 will also give with the cord and there is no tendency for the rubber to tear as might be the case if the wrapping means were not resilient. Furthermore, the friction between the latex bandage and the rubber is extremely great and this is accomplished without any sharp edges which would tear the rubber.

I claim:

1. A clothesline comprising a braided cord, the individual strands of which are formed of a flexible, smooth elastic material, means on the ends of said cord for maintaining the same in braided condition and for permitting the cord to be stretched between two spaced points, the strands of the cord being of such a nature that they may be temporarily parted to receive portions of garments and when released, will retain said garments in suspended relation.

2. A clothesline comprising a flexible, elastic cord or band having closely spaced substantially parallel portions to form apertures for receiving portions of fabric articles and retaining the same by reason of the elasticity or resiliency of the material making up the band.

3. A clothesline which is adapted to be used for suspending drying articles without the use of independent suspension means which comprises a band formed of one or more strands of smooth, flexible elastic material which band is provided with apertures along its length whereby, when said band is stretched and supported between two spaced points, portions of drying articles may be inserted into the apertures in said band and retained there by the flexibility of the material forming the same.

4. A clothesline comprising a flexible, smooth elastic cord or band which is provided with apertures for receiving portions of fabric articles and retaining the same by reason of the elasticity or resiliency of the material making up the band, means for fastening the ends of said line comprising a loop or ring member through which a portion of said cord is passed and doubled on itself, and a thin elastic bandage of latex wrapped around said cord and doubled back portion adjacent said loop or ring while under tension whereby a tight resilient collar is formed.

5. A clothesline comprising a braid of flexible elastic strands, operating when stretched to retain portions of garments between the strands of the braid and to retain the same by reason of the tension.

6. A clothesline comprising a braid of flexible elastic tubes.

7. A clothesline comprising a braid of flexible elastic strands, a portion of each end thereof being doubled upon itself through a ring, and means resiliently holding said doubled back portion adjacent the main portion.

8. A clothesline comprising a rubber strip having holes punched therein at spaced intervals, and means at each end thereof to permit the suspension of said line under tension.

9. A clothesline comprising a strip of expansible-contractable material with means at each end thereof to suspend the same between two points under tension, said strip having portions lying adjacently in longitudinally aligned relation to form apertures to receive portions of garments and retain the same by the inherent elasticity of the strip.

LLOYD G. COPEMAN.